United States Patent Office 3,723,186
Patented Mar. 27, 1973

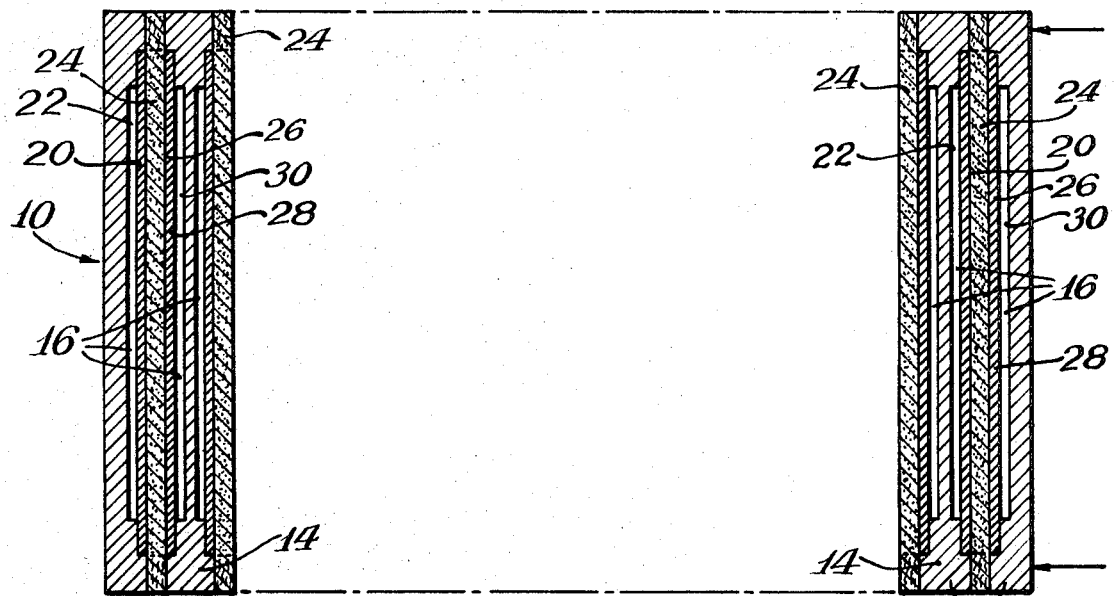
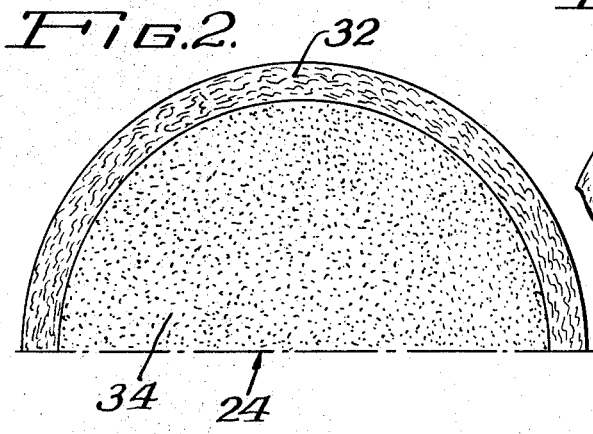
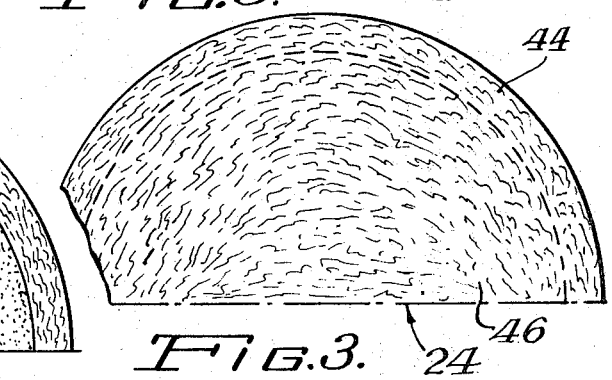
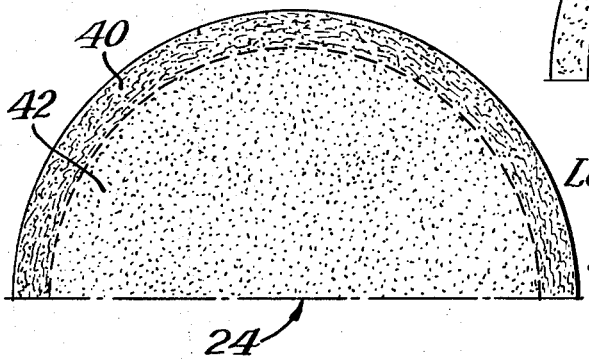
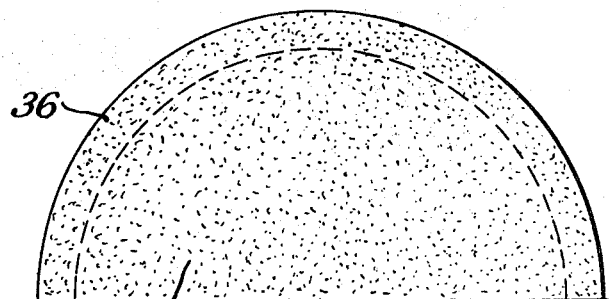

3,723,186
ELECTROLYTE SEAL MEANS
Alina Z. Borucka, Livingston, N.J., Leonard G. Marianowski, South Holland, Ill., and Bernard S. Baker, Brookfield Center, Conn., assignors to Institute of Gas Technology
Continuation-in-part of application Ser. No. 795,641, Jan. 31, 1969. This application Nov. 5, 1971, Ser. No. 196,168
Int. Cl. H01m 27/02, 43/06
U.S. Cl. 136—153
15 Claims

ABSTRACT OF THE DISCLOSURE

An electrolyte mass for high temperature electrochemical cells particularly for use in multiple cell batteries wherein the mass includes an integral seal. The electrolyte mass is the molten carbonate electrolyte type and is supported by an inert matrix or filler material. The improvement comprises a substantially rigid and substantially inert load supporting outer electrolyte periphery which is capable of withstanding the compressive forces necessary to hold each of the electrolyte masses in place in a multiple cell battery; the central portion of the electrolyte mass is integrally formed interior of the rigid outer periphery and is the electrochemically active portion of the cell.

CROSS-REFERENCE TO A RELATED CASE

This application is a continuation-in-part of our copending application Ser. No. 795,641 filed Jan. 31, 1969, now abandoned.

BACKGROUND OF THE INVENTION

Field of the invention and description of the prior art

This invention relates to an improved electrolyte mass having an integral seal for high temperature electrochemical cells, particularly for use in multiple cell batteries.

High temperature molten carbonate fuel cells are well known in the art and are used for converting chemical energy of hydrocarbons directly into electrical energy by a galvanic oxidation process. The fused or molten carbonates are considered to be the most desirable electrolyte material for high temperature fuel cells since decomposition or chemical change of the electrolyte by action of carbon dioxide, a typical hydrocarbon fuel reaction product, is impossible. Typically carbon dioxide is produced at the anode and is recovered and sent to the cathode, and is mixed with air to prevent carbon dioxide loss from electrolyte.

Fuel cells, and in particular molten carbonate fuel cells, generally consist of five principal parts. First, the cell has a fuel chamber to which a fuel mixture is fed. A fuel electrode is provided adjacent the fuel chamber and the fuel is anodically oxidized reaction with the carbonate ions. The electrolyte portion of the cell conducts the carbonate ions from the cathode to the anode. An air electrode is provided for oxygen to be galvanically reduced by reacting with carbon dioxide to produce the carbonate ion. The last element is the air chamber, and a mixture of air and carbon dioxide is fed into the air chamber.

Single fuel cells have operated continuously for an excess of a year with a drop in performance of from about 75 mw./cm.$^2$ to about 60 mw./cm.$^2$. This long life has been obtained by the use of a cell contained in an impervious alumina tube. The molten carbon electrolyte is placed in a center of a 9-inch long tubular member. The electrolyte is contained about its periphery by the alumina tube, and the electrolyte is compressed by the two electrodes. Although the tubular type of construction is satisfactory for single cell performance, it is not suitable for the construction of multiple cell batteries because of the impossibility of stacking such individual cells together.

A typical prior art manner of constructing multiple cell batteries was simply to stack the components together and bolt them together under pressure. However, on heating the electrolyte expands and additional pressure arises. This must be released by adjustment of the compression bolts or the cell will crack. If the adjustment is not carefully controlled, or the cell temperature varies, the cell could leak or crack during contraction or expansion.

A better way to construct multiple cell batteries is to sandwich them together, in a manner such as shown in U.S. patent application Ser. No. 509,082, now abandoned. In that U.S. patent application, there is described an improved process for constructing a multiple cell battery of the type generally described above. The cell components are stacked together and are heated in the stacked condition to a temperature at least as high as the melting point of the molten carbonate electrolyte. The heated components are subjected to only sufficient pressure for maintaining the stacked components in intimate association for providing good electrical and ionic contact. The components are then cooled and a high temperature multiple fuel cell assembly is constructed. When the desired number of individual cells have been stacked together, the complete assembly is tightened and is held together by means of end plates and bolting. The electrolyte plates thereby themselves act as structural membranes and therefore must bear the same compressive force as the rigid anode and cathode flanges.

However, in order for a multiple cell battery to operate properly, the electrodes must be in constant good electrical contact with the electrolyte. This is ordinarily achieved initially by uniform tightening of the battery assembly in which each paste electrolyte is initially evenly compressed. But such constant contact cannot be maintained because the paste electrolyte yields and the electric contacts deteriorate with time under the temperature and pressure. The battery assembly thus gradually loosens and good electrical contact is lost. The electrical contact can be re-established, however, by periodically retightening the battery assembly. However, if this periodic tightening is done excessively, the paste electrolyte masses will extrude from between the rigid anode-cathode flanges.

For such stacked multiple cell batteries, the electrolyte must be kept from extruding, and retaining rings have been used for this purpose. However, since the rigid flanges on opposite sides of the electrolyte must be insulated from each other for proper operation of the fuel cell, such a retaining ring must not be electronically conductive; thus, a metal ring cannot be used.

In order to overcome the non-insulating problem encountered with metal retaining rings, ceramic retaining rings have been used in the past. For example, solid, non-porous rings of alumina or magnesia have been used. However, these materials suffer the serious defect of cracking easily when the cell is subjected to its normal, relatively wide temperature changes and to mechanical compression. In addition, such ceramic rings are expensive.

Porous ceramic rings have also been used since these are mechanically stronger and are less susceptible to cracking due to temperature changes.

However, these porous ceramic rings have the disadvantage of absorbing the active molten carbonate from the active regions of the electrolyte. This absorption creates "dry spots" in the electrolyte mass and adversely affects the proper operation of the multiple cell battery.

SUMMARY OF THE INVENTION

It is therefore an important object of this invention to provide an improved electrolyte structure having integral sealing means, particularly for high temperature electrochemical cells for use in multiple cell batteries.

It is also an object of this invention to provide an improved electrolyte structure for high temperature fuel cells used in multiple cell batteries wherein the electrolyte mass itself has a self-sustaining rigid outer peripheral seal which withstands the compressive forces required for holding a multiplicity of individual fuel cells together in a multiple cell battery construction.

It is another object of this invention to provide an improved electrolyte mass for multiple cell high temperature fuel cells wherein the improved structure is characterized by its simplicity and economy of construction and manufacture.

It is a further object of this invention to provide an electrolyte structure with an integral, peripheral retaining portion which prevents the molten electrolyte in the central active portion of the electrolyte structure from escaping from the fuel cell, thereby acting as a hydraulic seal.

It is yet another object of this invention to provide an improved electrolyte structure having an integral outer seal which readily adjusts to the necessary thermal and mechanical stresses of the cell.

Further purposes and objects of this invention will appear as the specification proceeds.

In one of the important aspects of the invention, the electrolyte structure which is the subject of this invention comprises a substantially rigid, inert load supporting outer periphery or ring which is capable of withstanding the compressive forces required to hold an electrolyte membrane in a stacked position in a multiple cell battery, and an integrally formed electrochemically active central portion is defined as the interior of the outer periphery of the membrane.

BRIEF DESCRIPTION OF THE DRAWINGS

Particular embodiments of the present invention are illustrated in the accompanying drawings, wherein:

FIG. 1 is a diagrammatic cross-sectional view through a multiple fuel cell battery having molten carbonate type of electrolyte membranes;

FIG. 2 is a diagrammatic plan view of one half of one form of our preferred electrolyte structure;

FIG. 3 is another diagrammatic view of half of another preferred form of our improved electrolyte structure;

FIG. 4 is a diagrammatic plan view of half of still another preferred form of our improved fuel cell structure; and FIG. 5 is another diagrammatic plan view of still another embodiment of our improved electrolyte structure.

DESCRIPTION OF THE PREFERRED EMBODIMENTS

Referring to FIG. 1, there is diagrammatically shown a multiple cell battery, generally 10. The multiple cell battery 10 is comprised of a plurality of individual fuel cells, generally 12.

The components of the illustrated molten carbonate electrolyte fuel cell 10 include a frame 14, generally bipolar, which provides rigid support for the other components of the assembled fuel cell 10. The frame 14 is desirably made of stainless steel to provide the necessary strength and rigidity for the assembled fuel cell. The frame is conveniently circular in plan view and has a central recessed portion 16 and an outer peripheral load bearing portion. An anode electrode 20 is received within the central recess 16 of the frame so as to define an anode chamber 22 with the frame 14. The side of the anode plate 20 which is opposite to the anode chamber 22 is placed in intimate contact with the electrolyte mass 24.

The electrolyte 24 is a paste type electrolyte and is desirably the type shown and described in U.S. Pat. No. 3,150,657, in U.S. Pat. No. 3,257,239, and in U.S. patent application Ser. No. 509,082. Generally, the electrolyte plate 24 is a cold or hot pressed electrolyte material of a molten carbonate eutectic which is mixed with a finely divided oxide powder, such as magnesium oxide, alumina oxide, aluminates, or mixtures of other refractory oxides.

The opposite surface of the electrolyte 24 has a thin sprayed or painted layer 26, preferably of silver or a similar porous metal, such as copper oxide or nickel oxide, which acts as the cathode. A current collector 28 is positioned in intimate contact with the cathode side of the electrolyte 24. A cathode chamber 30 is defined between the current collector 28 and the recessed central portion 16 of the support frame 14.

As shown by the arrows in FIG. 1, in order to construct a multiple cell battery 10, pressure is applied to the end of the battery 10 by suitable means, such as by use of end plates and a bolting arrangement (not shown). In the structure shown, it is clear that the outer edges of the plaste type electrolyte 24 must bear the same compressive force as the rigid plate 14. As previously described, the paste type electrolytes are slow yielding and the battery assembly will loosen with time; upon retightening the assembly, the electrolyte 24 will normally eventually extrude from between the rigid anode-cathode flanges.

Referring to FIGS. 2-4, there are schematically shown various embodiments of the present invention wherein the electrolyte 24 is constructed in such a manner that it will withstand the compressive forces required to hold the multiple cell battery 10 together.

Referring to the embodiment of FIG. 2, the electrolyte 24 comprises an outer periphery or ring 32 which is formed integrally with the central electrochemically active portion 34 of the electrolyte 24. The outer periphery 32 is constructed with a filler or inert matrix, such as magnesium oxide, aluminum oxide, aluminates, mixtures of other refractory oxides, etc. However, it is important that the filler in the outer ring 32 is coarse relative to the filler used in the central active portion 34 of the electrolyte. The coarse filler particles cannot contain or support as much of the molten carbonate as the fine filler materials used in the central portion of the electrolyte. Thus, the outer periphery is much drier and stiffer than the bulk or electrochemically active portion of the electrolyte. The periphery or ring portion 32 of the electrolyte 24 withstands the compressive forces required to hold the fuel cells 12 together in a battery unit 10. Since the proper amount of carbonate is added to the coarse material in the outer periphery 32 as well as to the central active portion 34 of the electrolyte, the composition of the electrolyte 24 cannot be disturbed by easy migration of the carbonate to the peripheral portion as has been encountered in prior art porous ring structures.

By "fine," we mean filler particles which pass through a minus 325 mesh screen, and are accordingly smaller than —325 mesh. By "coarse," we mean filler particles which pass through a —20 mesh and are accordingly smaller than —20 mesh, with 60% or more between —20 and —325 mesh.

Referring to FIG. 3, another embodiment of the electrolyte 24 is shown. In this embodiment, the outer periphery 36 uses the same filler or inert matrix as used in the central portion 38 of the electrolyte. However, the electrolyte carbonate mixture used in the outer periphery melts at a higher temperature than the electrolyte in the central active portion 38. Preferably, in the outer periphery 36, an electrolyte containing a eutectic carbonate mixture or pure sodium or potassium carbonate or the like having a melting point in excess of the fuel cell operating temperature (which operating temperature is at least 400° C., and preferably about 500°-700° C.). The outer periphery electrolyte may, for example, have a melting point in the range of from about 725°-950° C. A molten carbonate mixture with a melting point, for example, of about 400° C. is used for the central active portion of the electrolyte. In this way, the outer peripheral ring 36 remains rigid at the normal operating temperature of the fuel cell, so that the electrolyte mass maintains the necessary structural strength.

In FIG. 4, there is shown still another alternate embodiment of the electrolyte 24. In this embodiment, the outer peripheral portion 40 has both a coarse filler or inert matrix material and a high melting point carbonate electrolyte. The central portion 42 has a relatively fine filler or inert matrix material and a lower melting point carbonate electrolyte. Thus, the embodiment of FIG. 4 is a combination of the embodiments described in FIGS. 2 and 3.

In FIG. 5, still a further embodiment of a preferred structure is shown. In this embodiment, there is an outer annular portion 44, having a higher ratio of filler or inert matrix to electrolyte than in the central electrochemically active portion 46. The outer peripheral ring 44 is, in this way, stiffer and less conductive than the central portion 46.

In those described embodiments, where the periphery remains rigid, while the electrolyte becomes melted or liquid at high temperatures, there is a further advantage since the phase of the outer ring itself acts to perform the function of a hydraulic seal thereby performing a uniform seal throughout the peripheral seal.

As one specific example of the invention, an electrolyte having a rigid outer periphery and an active central portion was constructed. The outer periphery contained 50 weight percent of a ternary carbonate and 50 weight percent of aluminate binder. The central active portion of the electrolyte contained 70 weight percent of the ternary carbonate, and 30 weight percent aluminate binder. Prior to fabrication, both the mixtures were tested separately to determine their deformation characteristics. The 70 weight percent carbonate mixture is a paste type electrolyte which deforms when force is applied. The 50 weight percent mixture in the outer periphery requires significantly more force to deform under identical circumstances.

The integral ring was formed with the aid of a removable separator which kept the powder separate while loading the pressing die. After loading, the separator was removed and the powders were compressed at 8000 p.s.i. The resulting disc was approximately ¼ of an inch thick and 3 inches in diameter. The ring portion of the disc was 3 inches outside diameter and 2½ inches inside diameter. This disc was later hot pressed at 500° C. and 8000 p.s.i. After hot pressing, the disc was temperature cycled several times without exhibiting any adverse effects.

While in the foregoing there has been provided a detailed description of various embodiments of the present invention, it is to be understood that all equivalents obvious to those having skill in the art are to be included within the scope of the invention as claimed.

What we claim and desire to secure by Letters Patent is:

1. An improved electrolyte mass adapted for assembly into high temperature fuel cells consisting of:
    (a) an ion-conducting carbonate electrolyte supported by a powdered inert matrix material forming said electrolyte mass,
    (b) said mass having a central portion and an integral outer periphery, both said outer periphery and said central portion being unitary portions of said electrolyte mass,
    (c) said carbonate of said central portion is molten and electrochemically active at the fuel cell operating temperature range of from about 400° to 700° C.,
    (d) said powdered inert matrix used with carbonate in said central portion is selected from a coarse or a fine matrix material in an amount sufficient to support said carbonate and form therewith a paste-type electrolyte,
    (e) said powdered inert matrix used with said carbonate in said outer periphery is selected from a coarse or a fine matrix material in an amount sufficient to form with said periphery carbonate a rigid hydraulic seal between said cells which withstands compressive forces on said cells at the normal operating temperature of said fuel cells, and
    (f) the carbonate content in said periphery portion being selected in an amount sufficient to prevent substantial migration of carbonate from said central portion.

2. The electrolyte mass of claim 1 wherein said inert matrix material is coarse in said periphery and is fine in said central portion, both said coarse material and said fine material supporting substantially the maximum amount of said ion-conducting molten electrolyte.

3. An electrolyte mass as in claim 1 wherein said carbonate in said periphery portion has a melting point in a range above that of said central portion carbonate.

4. An electrolyte mass as in claim 3 wherein said outer periphery portion carbonate has a melting point in the range of about 725° C. to 950° C.

5. An electrolyte mass as in claim 1 wherein said outer periphery contains a coarse inert matrix material, said central portion contains a fine inert matrix material, said coarse inert matrix material contains an electrolyte carbonate having a higher melting temperature than the electrolyte carbonate contained in said fine matrix material.

6. An electrolyte mass as in claim 1 wherein said outer periphery contains a higher ratio of inert matrix material to electrolyte than said central portion.

7. An electrolyte mass as in claim 6 wherein said carbonate comprises from 50–70% by weight in said central portion, and less than about 50% in said periphery.

8. An electrolyte mass as in claim 3 wherein said outer periphery contains a higher ratio of inert matrix material to electrolyte than said central portion.

9. An electrolyte mass as in claim 1 wherein the carbonate in said central portion is the same as in said periphery portion.

10. The electrolyte mass of claim 9 wherein said inert matrix material is coarse in said periphery and is fine in said central portion, both said coarse material and said fine material supporting substantially the maximum amount of said ion-conducting molten electrolyte.

11. An electrolyte mass as in claim 9 wherein said outer periphery contains a higher ratio of inert matrix material to electrolyte than said central portion.

12. An electrolyte mass as in claim 1 wherein said inert matrix material is selected from magnesium oxide, aluminum oxide, aluminates, or mixtures thereof.

13. An electrolyte as in claim 12 wherein said powdered inert matrix material is an aluminate.

14. An electrolyte mass as in claim 1 wherein said inert matrix material is a refractory oxide.

15. An electrolyte mass as in claim 1 wherein said carbonates in said central portion and in said periphery portion are selected from lithium, sodium, and potassium carbonates, and binary and ternary eutectic mixtures thereof.

References Cited
UNITED STATES PATENTS

| | | | |
|---|---|---|---|
| 3,365,334 | 1/1968 | Thellmann | 136—86 R |
| 3,404,041 | 10/1968 | Inami | 136—146 |
| 3,432,363 | 3/1969 | Gillis | 136—153 |
| 3,466,197 | 9/1969 | Bawa | 136—86 R |
| 3,481,788 | 12/1969 | Hamlen et al. | 136—86 R |

ANTHONY SKAPARS, Primary Examiner

U.S. Cl. X.R.

136—86 R